(12) United States Patent
Bair et al.

(10) Patent No.: US 8,516,577 B2
(45) Date of Patent: Aug. 20, 2013

(54) REGULATING ATOMIC MEMORY OPERATIONS TO PREVENT DENIAL OF SERVICE ATTACK

(75) Inventors: Michael S. Bair, Banks, OR (US);
David W. Burns, Portland, OR (US);
Robert S. Chappell, Portland, OR (US);
Prakash Math, Portland, OR (US);
Leslie A. Ong, Portland, OR (US);
Pankaj Raghuvanshi, Hillsboro, OR (US); Shlomo Raikin, Geva Carmel (IL); Raanan Sade, Kibutz Gvat (IL);
Michael D. Tucknott, Hillsboro, OR (US); Igor Yanover, Nesher (IL)

(73) Assignee: Intel Corporation, Santa Clara, CA (US)

(*) Notice: Subject to any disclaimer, the term of this patent is extended or adjusted under 35 U.S.C. 154(b) by 318 days.

(21) Appl. No.: 12/887,898

(22) Filed: Sep. 22, 2010

(65) Prior Publication Data

US 2012/0072984 A1    Mar. 22, 2012

(51) Int. Cl.
*G06F 21/00*    (2006.01)
(52) U.S. Cl.
USPC ............. 726/22; 710/305; 710/306; 711/118; 711/138
(58) Field of Classification Search
USPC ................... 726/22; 711/118, 138; 710/305, 710/306
See application file for complete search history.

(56) References Cited

U.S. PATENT DOCUMENTS

| | | | |
|---|---|---|---|
| 5,293,621 A | 3/1994 | White et al. | |
| 5,644,733 A | 7/1997 | Kalish et al. | |
| 5,717,876 A | 2/1998 | Robertson | |
| 6,078,981 A | 6/2000 | Hill et al. | |
| 6,141,715 A | 10/2000 | Porterfield | |
| 6,178,493 B1 | 1/2001 | Lenk et al. | |
| 6,247,121 B1 | 6/2001 | Akkary et al. | |
| 6,434,673 B1 | 8/2002 | Palanca et al. | |
| 6,920,516 B2 | 7/2005 | Hartwell et al. | |
| 7,000,047 B2 | 2/2006 | Nguyen et al. | |
| 7,082,500 B2 | 7/2006 | Scott et al. | |
| 7,320,100 B2 | 1/2008 | Dixon et al. | |
| 7,558,946 B2 | 7/2009 | Mendelson | |
| 7,590,784 B2 | 9/2009 | Math | |
| 2005/0044319 A1* | 2/2005 | Olukotun | 711/118 |
| 2006/0064695 A1 | 3/2006 | Burns et al. | |

(Continued)

FOREIGN PATENT DOCUMENTS

WO    WO01-97020    12/2001

OTHER PUBLICATIONS

Eyerman, et al., "A Top-Down Approach to Architecting CPI Component Performance Counters," IEEE Computer Society, 2007.

(Continued)

*Primary Examiner* — Brandon Hoffman
*Assistant Examiner* — Thong Truong
(74) *Attorney, Agent, or Firm* — Trop, Pruner & Hu, P.C.

(57) ABSTRACT

In one embodiment, the present invention includes a method for identifying a termination sequence for an atomic memory operation executed by a first thread, associating a timer with the first thread, and preventing the first thread from execution of a memory cluster operation after completion of the atomic memory operation until a prevention window has passed. This method may be executed by regulation logic associated with a memory execution unit of a processor, in some embodiments. Other embodiments are described and claimed.

20 Claims, 5 Drawing Sheets

(56) References Cited

U.S. PATENT DOCUMENTS

2006/0161738 A1 7/2006 Saha et al.
2007/0294702 A1 12/2007 Melvin et al.
2008/0059712 A1 3/2008 Fedorova

OTHER PUBLICATIONS

Ho, et al., "On Deadlock, Livelock, and Forward Progress," Technical Report, No. 633, May 2005.

Mirza-Afhatabar, et al., "An Adaptive Software-based Deadlock Recovery Technique," 22nd International Conference on Advanced Information Networking and Applications, IEEE, 2008.

International Searching Authority, "Notification of Transmittal of the International Search Report and the Written Opinion," mailed May 3, 2012 in international application No. PCT/US2011/052696.

* cited by examiner

REGULATING ATOMIC MEMORY OPERATIONS TO PREVENT DENIAL OF SERVICE ATTACK

BACKGROUND

Modern processors can be configured to handle execution of multiple active threads (e.g., a simultaneous multithreading (SMT) mode on a single core or multicore processor), or allow for multiple threads to execute on logical processors of one or more cores. In such instances, if one thread is running in an infinite loop of atomic memory operations such as bus locks (e.g., an atomic lock operation involving a non-writeback (WB) memory type, or when WB memory is used but an operand address crosses a cache line boundary) and another thread needs to execute a load or store operation, only the thread executing the bus locks can make any forward progress. That is, the bus locks executed by the first thread can be so close together that a new bus lock is started just after the previous bus lock finishes such that the other thread may be prevented from executing a memory operation such as a load or store operation.

Such atomic memory operations are thus very powerful and can prevent other memory operations (e.g., loads or stores) from proceeding while a bus lock is in progress. This creates a denial of service security attack where a user (e.g., executing in a user privilege level, e.g., a ring 3, or current privilege level (CPL) 3) can write a very small loop of macro-instructions that can block other users/programs from functioning. In addition to affecting operations of threads running in the same core, this type of operation/attack can even block the progress of users/programs on a different core within the same processor and/or running on a different processor package within the system.

DETAILED DESCRIPTION

In various embodiments, logic of a processor may provide for regulation of atomic memory operations by a given thread such that the thread does not adversely affect performance of other threads executing in the processor. In some embodiments, this logic may be associated with a memory execution unit of the processor, and may act to regulate or delay certain operations from being provided to the memory execution unit. Such operations can include different types of atomic memory operations including bus locks. Such bus locks can adversely affect performance, as virtually all other operations of the processor and other agents of the system may need to be quiesced in order to properly handle the bus lock operation. To prevent a consecutive series of such bus locks from acting as a denial of service attack, regulation or other logic of the processor may act to delay and/or sequester consecutive atomic memory operations of a given thread.

Figure 1:
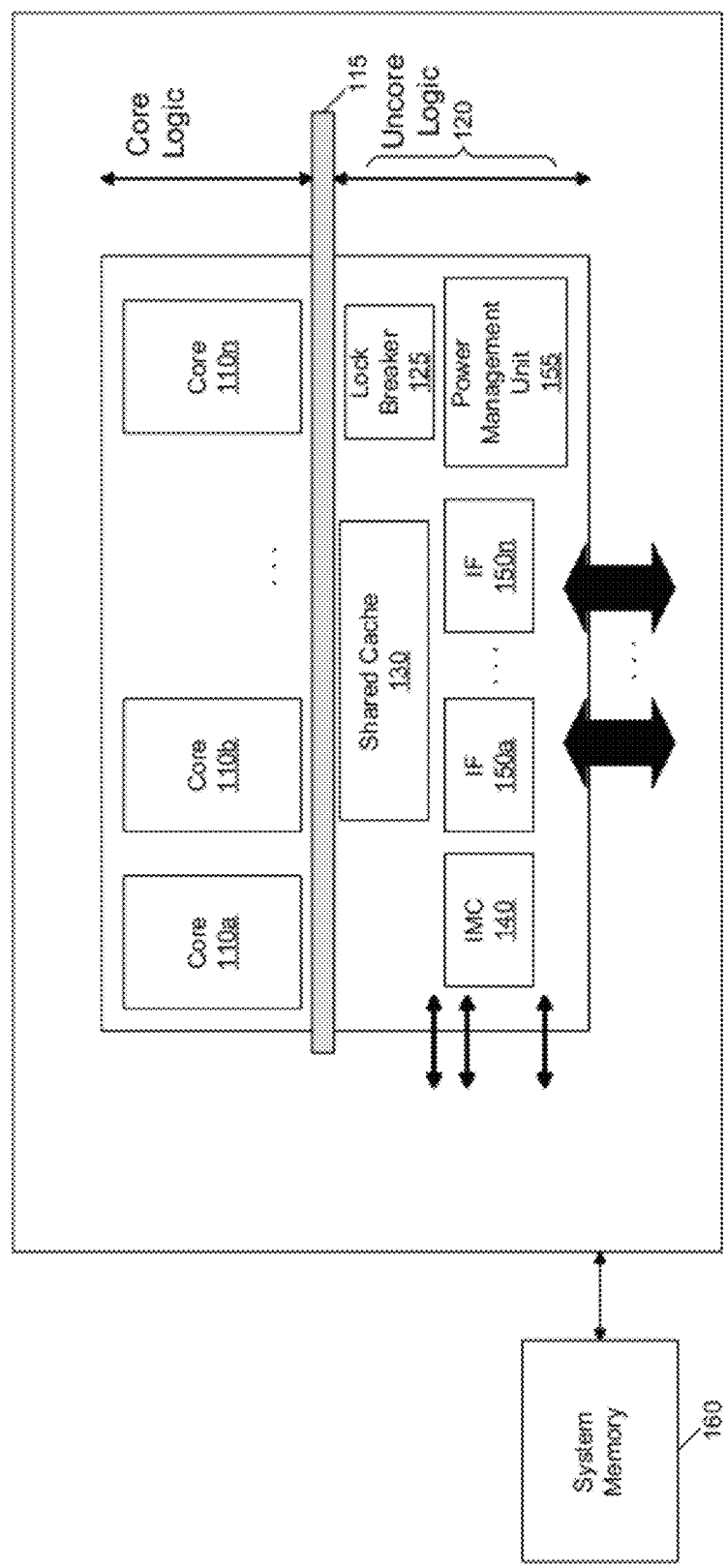
FIG. 1 is a block diagram of a processor in accordance with an embodiment of the present invention.

Referring now to FIG. 1, shown is a high level block diagram of a processor in accordance with an embodiment of the present invention. As shown in FIG. 1, processor 100 may be a multicore processor including a plurality of cores $110_a$-$110_a$. Understand that these cores may be physical processors in that they may include various components such as front end units, execution units and back end units, as will be discussed in more detail below. In addition, in some embodiments each core may include one or more logical processors. Such logical processors may provide for concurrent execution of multiple threads. In general, a logical processor may include the state associated with a given thread, e.g., as stored in a register file for that thread. However, all other components of the core, such as front end units, execution units, back end units and so forth are shared between the multiple logical processors and threads executing on such logical processors.

The various cores may be coupled via an interconnect 115 to an uncore logic 120 which is logic of the processor outside of the core that includes various components. Uncore 120 may include a shared cache 130 which may be a last level cache. In addition, the uncore may include an integrated memory controller 140, various interfaces 150 and a power management unit 155. As seen, processor 100 may communicate with a system memory 160, e.g., via a memory bus.

Uncore 120 may further include a lock breaker 125, which may be logic to detect a lock event such as a live lock or deadlock situation in which a thread executing on a core is inexplicably stalled or cannot make forward progress. In general, lock breaker 125 may perform multiple lock breaking activities of increasing weight (and which can adversely affect performance) in order to break the lock. Typically a lock breaker begins execution of a lock breaking activity responsive to detection of a live lock or a deadlock.

Still with respect to FIG. 1, interfaces 150 may enable communication with various off-chip components such as peripheral devices, mass storage and so forth. While shown with this particular implementation in the embodiment of FIG. 1, the scope of the present invention is not limited in this regard.

Figure 2:
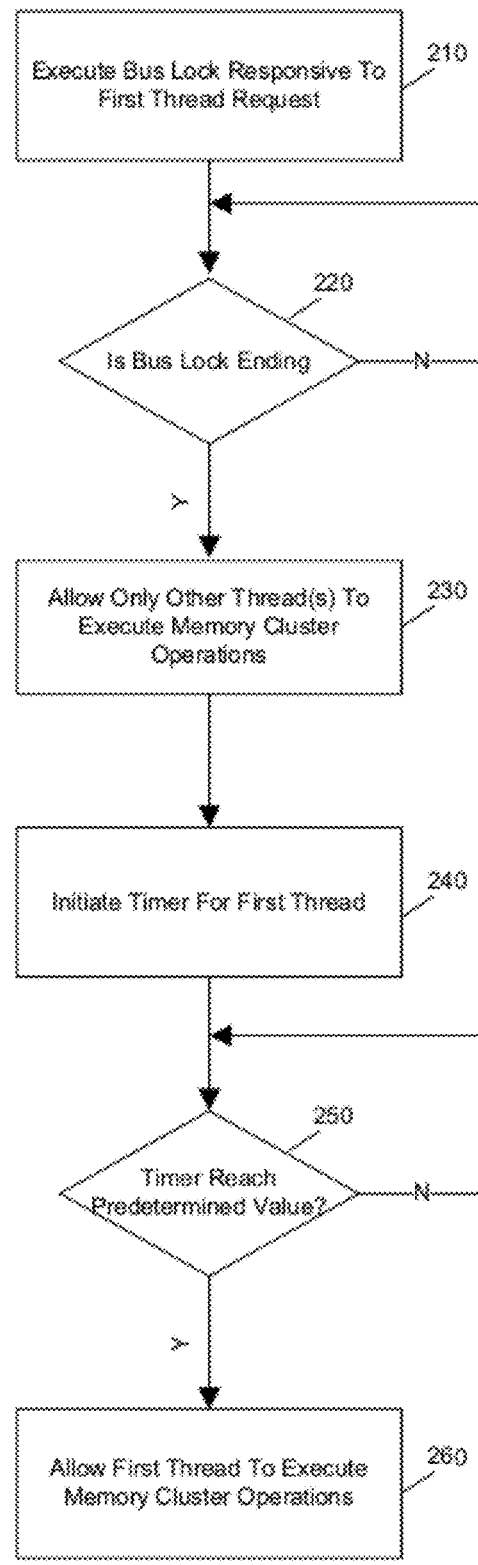
FIG. 2 is a flow diagram of a method in accordance with one embodiment of the present invention.

Referring now to FIG. 2, shown is a flow diagram of a method in accordance with one embodiment of the present invention. As shown in FIG. 2, method 200 may be used to control access to atomic memory operations by one or more agents. While the discussion of FIG. 2 is with regard to a bus lock operation as an example atomic memory operation, the scope of the present invention is not limited in this regard. For example, in other embodiments other types of atomic memory operations such as certain cache locks also may be regulated. For example, cache locks that are atomic operations having a WB memory type and a cache-aligned address (such that it fits entirely within a single cache line) can prevent another thread from using the MEU. While cache lock durations are generally shorter than bus locks, they can still be used to create a denial of service attack within a single SMT core. Thus embodiments may be used to regulate such operations as well.

With reference to FIG. 2, a bus lock regulator or other such logic may execute the method of FIG. 2 to prevent a thread from executing consecutive bus locks, without providing for a predetermined time to pass between the bus locks. In this way, a thread that is under a denial of service or other such security attack can be prevented from unnecessarily consuming system resources.

As seen in FIG. 2, method 200 may begin when a bus lock is executed responsive to a given thread, namely a request from a first thread (block 210). Operations that may initiate a bus lock operation can vary and may include, for example, macro-instructions that implicitly perform atomic operations (e.g., an exchange instruction is one example), handling of memory operations that miss in a translation lookaside buffer (TLB) and need to cause execution of a page miss handler (PMH) to execute a page walks, or for microcode flows used to handle a variety of cases including some operating system-level macro-instructions. Various operations may be performed to execute the bus lock. Specifically, a thread executing on a core may cause issuance of a bus lock request from a memory subsystem of the core to other logic of a processor such as uncore logic. In turn, this uncore logic may issue a halt-type request to all other system agents, both internal to a given processor as well as agents external thereto such as other processors (in a multiprocessor system example). Then responsive to receipt of this halt request in other agents, these agents will execute various operations to quiesce their operation. These operations may include completing all pending operations, draining various buffers, retiring executed instructions and so forth. When all such operations have completed in a given agent, the agent may send an indicator signal back to the uncore logic to indicate that it is in the quiesce state. Finally, when all such signals have been received by the uncore logic, the uncore logic may in turn send a ready signal to the first thread to indicate that the bus lock can now be executed. Thus a significant amount of operations are needed to implement a bus lock, and while in this state, other agents of a system can be prevented from doing useful work.

As seen in FIG. 2, during the bus lock operation, the regulator or other logic executing method 200 may determine whether the bus lock is ending (diamond 220). While the scope of the present invention is not limited in this regard, in some embodiments this determination may be based on certain operations performed at the end of a bus lock sequence. These operations may vary in different embodiments. For example, operations that signify the end of a bus lock may involve retirement of (or execution of an @retirement) store unlock micro-instruction. If this bus lock end sequence is not detected, diamond 220 loops back on itself.

Otherwise, control passes to block 230. At block 230, the logic may allow only other threads to execute memory cluster operations. That is, the first thread that has just completed execution of a bus lock may be prevented from accessing a memory execution unit to perform memory cluster operations. In this way, a denial of service or other style of attack where a thread continually seeks to execute bus locks can be avoided. Note that while at block 230, the thread is prevented from execution of memory cluster operations, in other applications different prevention mechanisms may be provided instead. For example, in some implementations rather than preventing all memory cluster operations, only such operations that seek to execute a bus lock can be prevented. In still further embodiments, the prevention mechanism may be directed to other functions and can provide a greater impact to the issuing thread. For example, the prevention mechanism may suspend all operations of the issuing thread, not just its use of the memory execution unit. In yet other implementations, it can even block all threads of the core that just completed a bus lock from using the memory execution unit. In this way, a denial of service scenario can be prevented where bus locks quickly originate from different threads on the same core (e.g., locks that ping pong between threads), resulting in denial of service attacks on the remainder of the system/platform.

Control passes next to block 240, where a timer for the first thread may be initiated. As will be discussed further below, in some embodiments this timer may correspond to a counter, e.g., a 12-bit down counter. This timer thus presents a prevention window during which the corresponding thread (i.e., the thread that just executed a bus lock) is prevented from memory cluster operations. Note that while shown as separate blocks 230 and 240, in some implementations these blocks may be combined into an atomic flow.

Still referring to FIG. 2, at diamond 250 it may be determined whether this timer has reached a predetermined value. For example, in an implementation in which the timer is realized via a counter, this predetermined value may correspond to a count of zero, in a down counter embodiment. Instead, in an up counter embodiment, this predetermined value may correspond to a maximum count for the counter. If this count value has not been reached, control loops back to diamond 250.

If instead the count value has been reached, control passes to block 260. There the given thread may be allowed to execute memory cluster operations again. That is, this thread may have a prevention mechanism removed. As such, memory cluster dispatch activity for the thread may resume normally. Still further, at block 260 the timer may be set back to its initial value. While shown with this particular implementation in the embodiment of FIG. 2, the scope of the present invention is not limited in this regard.

Thus in general, embodiments may avoid the need for taking aggressive lock breaking activities such as performed by a livelock or deadlock detector by instead analyzing operations to identify execution of an atomic memory operation and taking appropriate measures to prevent a consecutive sequence of such operations. In an example where the atomic operation is a bus lock, logic may identify which logical processor is executing the bus lock. Then the conclusion of this bus lock may be detected, e.g., by determining when the logical processor initiates a sequence to complete its bus lock. Responsive to this determination, this logical processor may be prevented from initiating another bus lock for a predetermined time. For example, when the bus lock sequence ends, the logical processor can be prevented from starting another bus lock until a counter value, e.g., of a 12-bit programmable counter, decrements to zero. Thereafter, this logical processor may be allowed to issue another bus lock, and the associated time can be reset back to its original starting value.

In one embodiment, a maximum value for the counter, which can be a programmable register, can be set by and modified by microcode. Still further, the regulator logic, upon detection of a number of closely issued atomic memory operations by a thread using detection logic of the regulator logic, may increase a length of the counter associated with the thread, as such number of operations may be indicative of an attack executed by the thread. In this way, the prevention window for a thread can be controlled based at least in part on the number of requested atomic memory operations by the thread. Also in some embodiments, a microcode programmable enable/disable indicator may be provided to enable/disable regulator logic that performs this atomic memory operation regulation.

In this way, a lighter mechanism to prevent a consecutive sequence of atomic memory operations by a thread may be realized. In contrast, using a conventional manner such as a livelock or deadlock breaker much heavier mechanisms would be used. In this conventional manner, when one thread runs a continual stream of bus locks, one or more livelock breakers eventually detect that another thread(s) are unable to make forward progress (e.g., by retiring more instructions). The livelock breakers then begin to take actions. For example, a first livelock breaker corresponding to a memory execution unit (MEU) live lock breaker (LLB) may detect the problem and take some action. If this MEU LLB is unable to help the non-bus lock thread, a request may be made to another detector such as a core retirement detector (CRD) to trigger an all-thread nuke in the stuck core. This nuke allows the stuck thread to retire one instruction. The other thread can then restart its stream of bus locks and the scenario repeats itself over and over. But such operations lead to very poor performance.

Thus in various embodiments instead of detecting that one thread is stuck and not making progress and prior to spending a long time before any effective actions are taken, a thread completing an atomic memory operation is controlled to prevent a consecutive atomic operation, at least for a predetermined time after completion of a first atomic operation. In this way a minor performance penalty may be incurred by the thread that just completed the atomic operation by waiting the predetermined time period before allowing it to perform another atomic memory operation (which may include preventing access to the MEU by this thread for the time period). This prevention mechanism thus enables other thread(s) from ever getting stuck in the first place. Accordingly, embodiments provide for a programmable window of time before a thread completing an atomic memory operation can start a new memory instruction. Even the thread that undergoes prevention should not have a significant performance impact, as such atomic operations are a low performance activity anyway.

In this way, a more secure and robust processor can be realized by preventing malicious code from using bus locks (any user can write code with bus locks) to significantly degrade system performance and performance of other users and/or programs.

Figure 3:
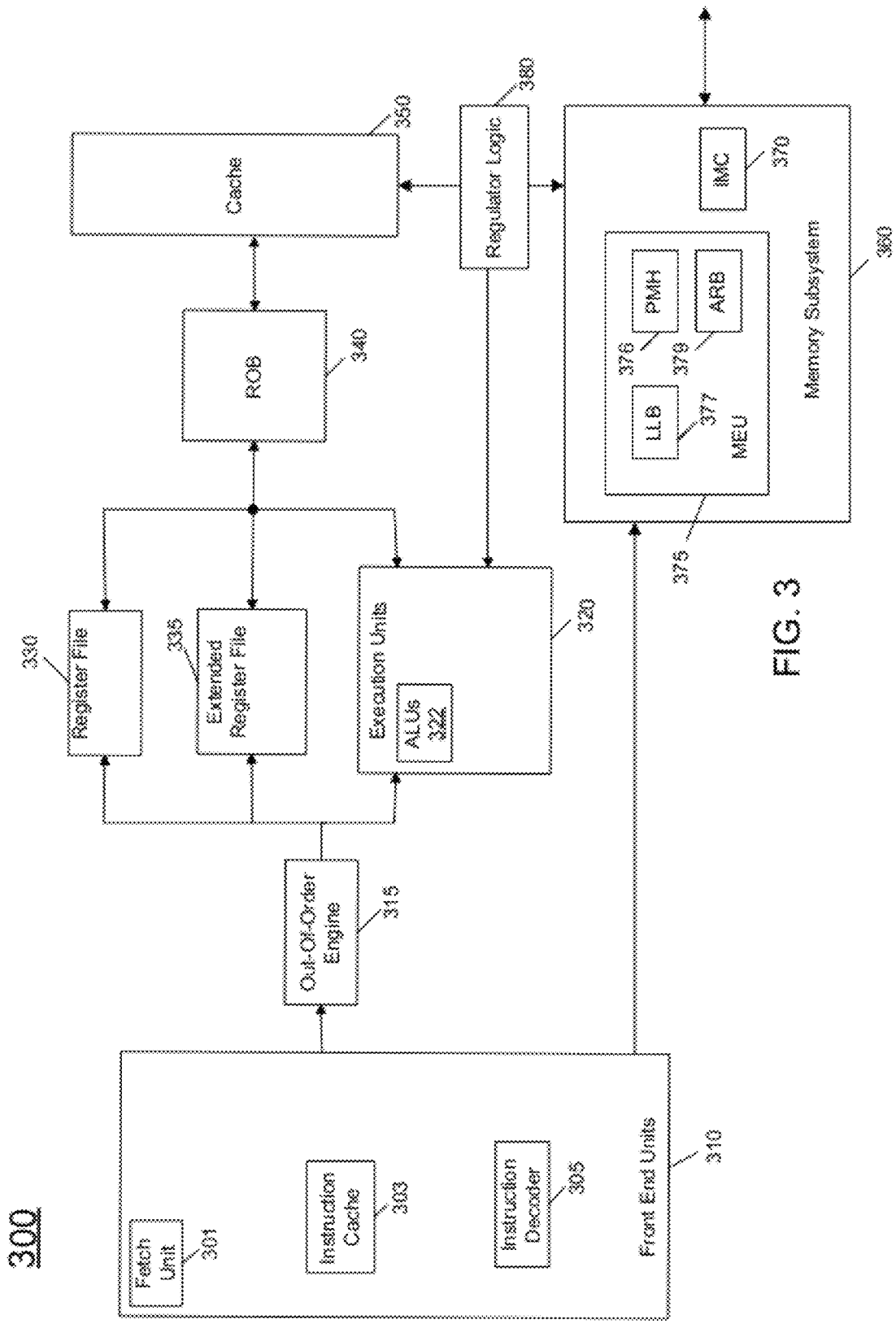
FIG. 3 is a block diagram of a processor core in accordance with an embodiment of the present invention.

Embodiments can be implemented in many different systems. For example, embodiments can be realized in a processor such as a multicore processor. Referring now to FIG. 3, shown is a block diagram of a processor core in accordance with one embodiment of the present invention. As shown in FIG. 3, processor core 300 may be one core of a multi-core processor, and is shown as a multi-stage pipelined out-of-order processor. Processor core 300 is shown with a relatively simplified view in FIG. 3 to illustrate various features used in connection with memory subsystem regulation in accordance with an embodiment of the present invention.

As shown in FIG. 3, core 300 includes front end units 310, which may be used to fetch instructions to be executed and prepare them for use later in the processor. For example, front end units 310 may include a fetch unit 301, an instruction cache 303, and an instruction decoder 305. In some implementations, front end units 310 may further include a trace cache, along with microcode storage as well as a micro-operation storage. Fetch unit 301 may fetch macro-instructions, e.g., from memory or instruction cache 303, and feed them to instruction decoder 305 to decode them into primitives, i.e., micro-operations for execution by the processor.

Coupled between front end units 310 and execution units 320 is an out-of-order (OOO) engine 315 that may be used to receive the micro-instructions and prepare them for execution. More specifically OOO engine 315 may include various buffers to re-order micro-instruction flow and allocate various resources needed for execution, as well as to provide renaming of logical registers onto storage locations within various register files such as register file 330 and extended register file 335 such as by using renaming logic of the engine. Register file 330 may include separate register files for integer and floating point operations. Extended register file 335 may provide storage for vector-sized units, e.g., 256 or 512 bits per register.

Various resources may be present in execution units 320, including, for example, various integer, floating point, and single instruction multiple data (SIMD) logic units, among other specialized hardware. For example, such execution units may include one or more arithmetic logic units (ALUs) 322. Of course other execution units such as multiply-accumulate units and so forth may further be present. Results may be provided to retirement logic, namely a reorder buffer (ROB) 340. More specifically, ROB 340 may include various arrays and logic to receive information associated with instructions that are executed. This information is then examined by ROB 340 to determine whether the instructions can be validly retired and result data committed to the architectural state of the processor, or whether one or more exceptions occurred that prevent a proper retirement of the instructions. Of course, ROB 340 may handle other operations associated with retirement.

As shown in FIG. 3, ROB 340 is coupled to a cache 350 which, in one embodiment may be a low level cache (e.g., an L1 cache). In some embodiments, execution units 320 can be directly coupled to cache 350. In turn, various processor structures including the cache, execution units, and front end logic, for example, may be coupled to a memory subsystem 360. This memory subsystem may provide an interface between processor structures and further portions of a memory hierarchy, e.g., an on or off-chip cache and a system memory. To that end, memory subsystem 360 may include an integrated memory controller 370 to provide for communication with a system memory (not shown for ease of illustration in FIG. 3). Memory subsystem 360 may further include a memory execution unit 375 that handles various operations to initiate memory requests and handle return of data from memory. For example, as shown in the embodiment of FIG. 3, MEU 375 may include a page miss handler 376 to handle memory operations when requests miss in the cache, a MEU LLB 377, and an arbitrator 379 to arbitrate among various memory requests. Further, while not shown understand that other structures such as buffers, schedulers and so forth may be present in the MEU.

As further seen in FIG. 3, a regulator logic 380 may be coupled to MEU 375. More specifically, regulator logic 380 may be coupled between the other components of core 300 and MEU 375 to act as a regulator to prevent consecutive atomic memory operations from a given thread executing on the core. To that end, logic 380 may include trackers associated with each core, where each tracker can include a timer or other such counter that is initiated on completion of a first atomic memory operation by the corresponding thread, and which when activated, prevents another atomic memory operation from that thread from being provided to MEU 375 until a threshold of the timer (e.g., a maximum count) is reached. In addition, logic 380 may include buffers each configured to store atomic memory operations issued by a corresponding thread, so that such operations can be issued after any prevention window has passed.

From memory subsystem 360, data communication may occur with higher level caches, system memory and so forth. While shown with this high level in the embodiment of FIG. 3, understand the scope of the present invention is not limited in this regard. For example, while the implementation of FIG. 3 is with regard to an out-of-order machine such as of a so-called x86 instruction set architecture (ISA) architecture, the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry, such as shown below with regard to FIG. 4.

That is, in other embodiments, a processor architecture may include emulation features such that the processor can execute instructions of a first ISA, referred to as a source ISA, where the architecture is according to a second ISA, referred to as a target ISA. In general, software, including both the OS and application programs, is compiled to the source ISA, and hardware implements the target ISA designed specifically for a given hardware implementation with special performance and/or energy efficiency features.

Figure 4:
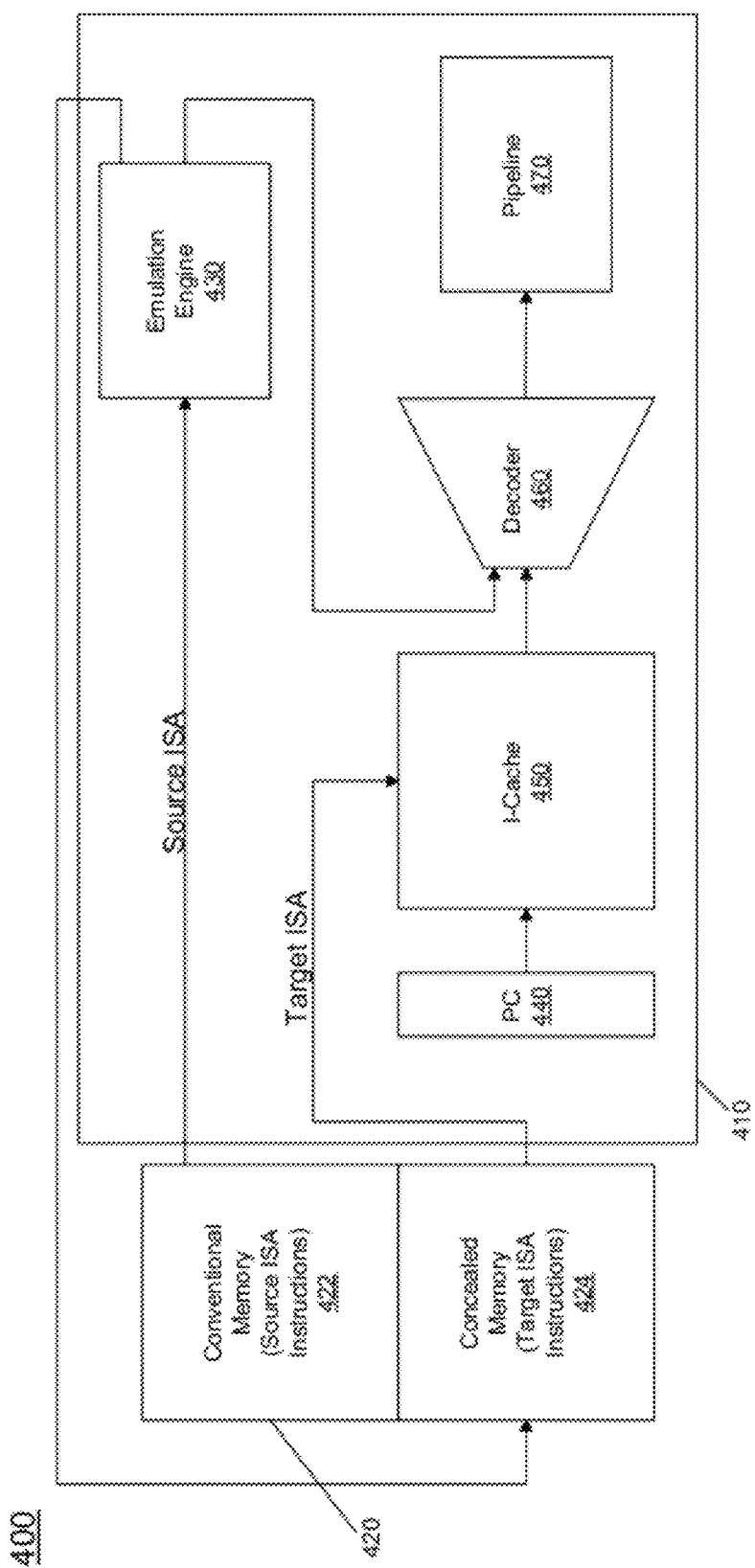
FIG. 4 is a block diagram of a processor core in accordance with another embodiment of the present invention.

Referring now to FIG. 4, shown is a block diagram of a processor in accordance with another embodiment of the present invention. As seen in FIG. 4, system 400 includes a processor 410 and a memory 420. Memory 420 includes conventional memory 422, which holds both system and application software, and concealed memory 424, which holds software instrumented for the target ISA. As seen, processor 410 includes an emulation engine 430 which converts source code into target code. Emulation may be done with either interpretation or binary translation. Interpretation is often used for code when it is first encountered. Then, as frequently executed code regions (e.g., hotspots) are discovered through dynamic profiling, they are translated to the target ISA and stored in a code cache in concealed memory 424. Optimization is done as part of the translation process and code that is very heavily used may later be optimized even further. The translated blocks of code are held in code cache 424 so they can be repeatedly re-used.

Still referring to FIG. 4, processor 410, which may be one core of a multicore processor, includes a program counter 440 that provides instruction pointer addresses to an instruction cache (I-cache) 450. As seen, I-cache 450 may further receive target ISA instructions directly from concealed memory portion 424 on a miss to a given instruction address. Accordingly, I-cache 450 may store target ISA instructions which can be provided to a decoder 460 which may be a decoder of the target ISA to receive incoming instructions, which may be at the macro-instruction level and to convert the instructions to micro-instructions for execution within a processor pipeline 470. While the scope of the present invention is not limited in this regard, pipeline 470 may be an out-of-order pipeline including various stages to perform and retire instructions. Pipeline 470 may include logic configured to prevent denial of service attacks. Such logic may be similar to regulator logic 380 of FIG. 3 to identify a consecutive sequence of atomic memory operations and to delay or prevent such operations from affecting performance of other threads of execution.

Figure 5:
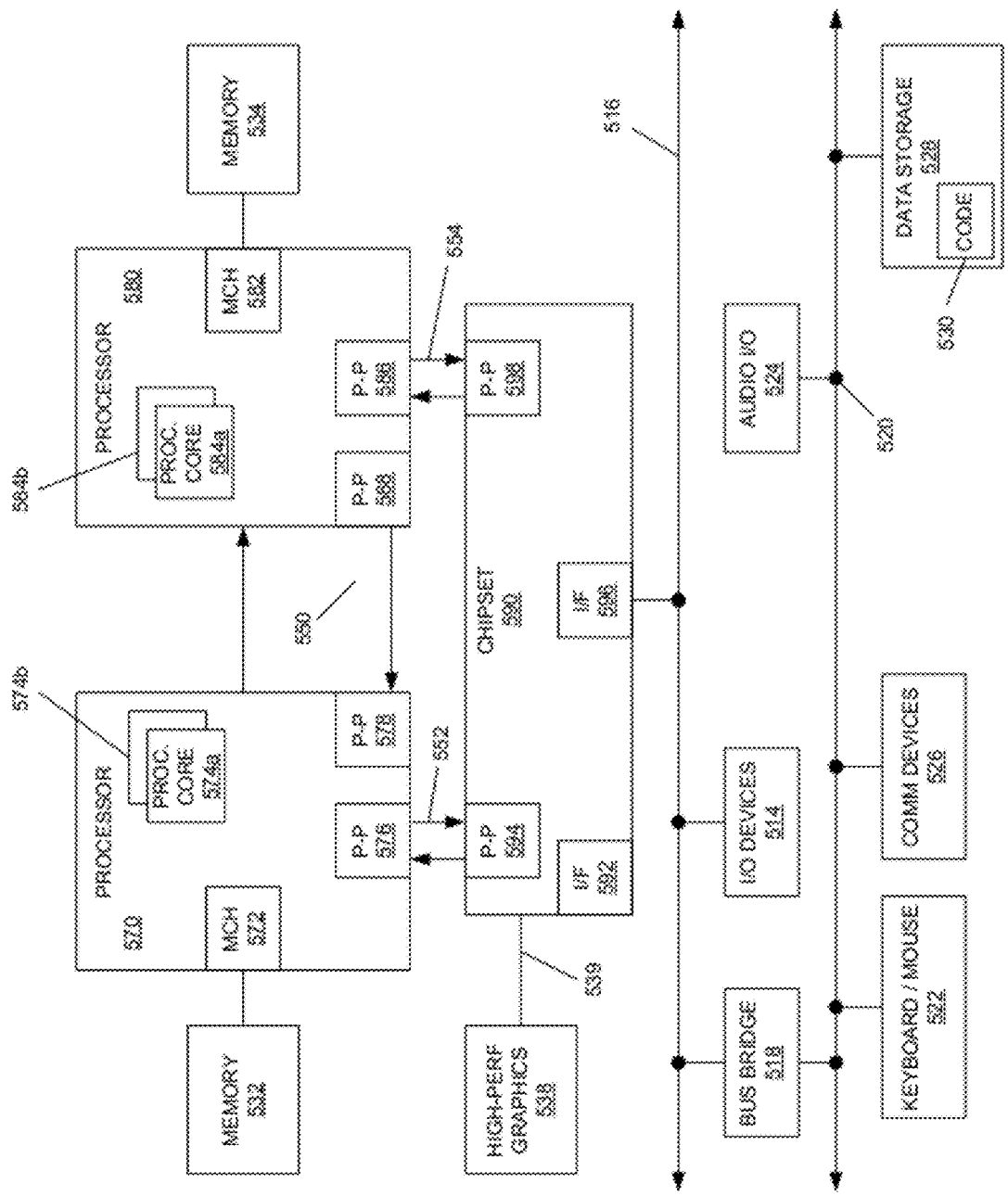
FIG. 5 is a block diagram of a system in accordance with an embodiment of the present invention.

Embodiments may be implemented in many different system types. Referring now to FIG. 5, shown is a block diagram of a system in accordance with an embodiment of the present invention. As shown in FIG. 5, multiprocessor system 500 is a point-to-point interconnect system, and includes a first processor 570 and a second processor 580 coupled via a point-to-point interconnect 550. As shown in FIG. 5, each of processors 570 and 580 may be multicore processors, including first and second processor cores (i.e., processor cores 574a and 574b and processor cores 584a and 584b), although potentially many more cores may be present in the processors. Such cores may include regulation logic in accordance with an embodiment of the present invention to reduce or prevent denial of service attacks from affecting other threads of execution.

Still referring to FIG. 5, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 5, MCH's 572 and 582 couple the processors to respective memories, namely a memory 532 and a memory 534, which may be portions of main memory (e.g., a dynamic random access memory (DRAM)) locally attached to the respective processors. First processor 570 and second processor 580 may be coupled to a chipset 590 via P-P interconnects 552 and 554, respectively. As shown in FIG. 5, chipset 590 includes P-P interfaces 594 and 598.

Furthermore, chipset 590 includes an interface 592 to couple chipset 590 with a high performance graphics engine 538, by a P-P interconnect 539. In turn, chipset 590 may be coupled to a first bus 516 via an interface 596. As shown in FIG. 5, various input/output (I/O) devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Note that while shown in the embodiment of FIG. 5 as a multi-package system (with each package including a multi-core processor) coupled via point-to-point interconnects, the scope of the present invention is not so limited. In other embodiments, other interconnects such as a front side bus may couple together processors in a dual or multiprocessor system. Still further, understand that embodiments may further be used in uniprocessor systems, e.g., in a system having a processor with a single core or multiple cores, and which may (or may not) provide support for SMT.

Embodiments may be implemented in code and may be stored on a storage medium having stored thereon instructions which can be used to program a system to perform the instructions. The storage medium may include, but is not limited to, any type of non-transitory storage medium such as disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a first core to execute instructions of a first thread and a second thread, the first core having a memory execution unit to handle requests for memory operations by the first and second threads and a regulator logic to prevent the first thread from execution of a second atomic memory operation after completion of a first atomic memory operation until a time window has passed since completion of the first atomic memory operation, wherein the regulator logic is to prevent issuance of the second atomic memory operation to the memory execution unit if a first counter associated with the first thread is in execution of a count operation associated with a passage of the time window.

2. The processor of claim 1, wherein the regulator logic further is to allow the first thread to execute the second atomic memory operation after the time window has passed.

3. The processor of claim 1, further comprising at least one lock breaker to execute a lock breaking action when a lock situation has been detected in the first core.

4. The processor of claim 3, wherein the regulator logic is to prevent execution of the second atomic memory operation so that the at least one lock breaker not initiate a lock breaking action responsive to a plurality of atomic memory operations issued by the first thread.

5. The processor of claim 1, wherein the regulator logic includes a plurality of counters each associated with a corresponding thread executing on the first core.

6. The processor of claim 1, wherein the regulator logic is to initiate the first counter responsive to detection of a termination sequence of the first atomic memory operation.

7. The processor of claim 1, wherein a length of the count operation is programmable by microcode of the processor.

8. The processor of claim 1, wherein the regulator logic is to enable the second thread to make forward progress when a denial of service attack is executed by the first thread.

9. The processor of claim 8, wherein the regulator logic is to lengthen the time window associated with the first thread when the denial of service attack is detected by the regulator logic.

10. The processor of claim 1, wherein the regulator logic is to be disabled responsive to microcode of the processor.

11. A method comprising:
   executing, by a first core, instructions of a first thread and a second thread, the first core having a memory execution unit to handle requests for memory operations by the first and second threads; and
   preventing, by a regulator logic of the first core, the first thread from execution of a second atomic memory operation after completion of a first atomic memory operation until a time window has passed since completion of the first atomic memory operation, wherein the regulator logic is to prevent issuance of the second atomic memory operation to the memory execution unit if a first counter associated with the first thread is in execution of a count operation associated with a passage of the time window.

12. The method of claim 11, further comprising holding a request for the second atomic memory operation issued by the first thread in a buffer until the time window has passed.

13. The method of claim 11, where the first atomic memory operation comprises a bus lock operation.

14. The method of claim 11, further comprising controlling a duration of the time window based at least in part on a number of atomic memory operations requested by the first thread.

15. The method of claim 11, further comprising allowing the second thread to execute a third atomic memory operation during the time window, and thereafter preventing the second thread from execution of a memory cluster operation until a second time window has passed.

16. The method of claim 15, further comprising preventing a denial of service attack executed by the first thread from blocking execution of the second thread.

17. The method of claim 16, wherein preventing the first thread from execution of the second atomic memory operation until the time window has passed since the completion of the first atomic memory operation allows the second thread to make progress in execution of the third atomic memory operation without initiation of a lock breaking operation by a lock breaker coupled to the first core.

18. A system comprising:
   a processor including at least one core to execute instructions, the at least one core including:
      a front end unit to fetch and decode an instruction;
      a renamer to associate at least one operand of the instruction with a physical register;
      an execution unit coupled to the front end unit to execute the instruction using the at least one operand;
      a memory execution unit (MEU) coupled to the execution unit to handle incoming memory requests from the execution unit; and
      a regulator coupled to the MEU to delay at least one atomic memory operation requested by a first thread from being provided to the MEU responsive to termination of a prior atomic memory operation requested by the first thread, wherein the regulator includes a timer associated with the first thread, the timer to indicate passage of a delay time period during which the at least one atomic memory operation is delayed from being provided to the MEU; and
   a dynamic random access memory (DRAM) coupled to processor.

19. The system of claim 18, wherein the regulator is to allow an atomic memory operation requested by a second thread to be provided to the MEU while the at least one atomic memory operation requested by the first thread is delayed.

20. The system of claim 19, wherein via the delay of the at least one atomic memory operation, the regulator is to allow the second thread to make forward progress when the first thread is executing a denial of service attack, and further via the delay, at least one lock breaker of the processor does not initiate a lock breaking activity.

* * * * *